(12) United States Patent
Ignatchenko et al.

(10) Patent No.: US 10,528,767 B2
(45) Date of Patent: Jan. 7, 2020

(54) SYSTEMS, METHODS AND APPARATUSES FOR SECURE STORAGE OF DATA USING A SECURITY-ENHANCING CHIP

(71) Applicant: OLogN Technologies AG, Triesen/FL (LI)

(72) Inventors: Sergey Ignatchenko, Innsbruck (AT); Dmytro Ivanchykhin, Kiev (UA)

(73) Assignee: OLogN Technologies AG, Triesen/FL (LI)

( * ) Notice: Subject to any disclaimer, the term of this patent is extended or adjusted under 35 U.S.C. 154(b) by 687 days.

(21) Appl. No.: 14/229,531

(22) Filed: Mar. 28, 2014

(65) Prior Publication Data
US 2014/0298040 A1    Oct. 2, 2014

Related U.S. Application Data

(60) Provisional application No. 61/806,639, filed on Mar. 29, 2013.

(51) Int. Cl.
*G06F 21/72* (2013.01)

(52) U.S. Cl.
CPC .................. *G06F 21/72* (2013.01)

(58) Field of Classification Search
CPC .................. H04L 9/00; H04L 9/3234
See application file for complete search history.

(56) References Cited

U.S. PATENT DOCUMENTS

| | | | | |
|---|---|---|---|---|
| 7,181,015 B2 * | 2/2007 | Matt | ..................... | H04L 9/083 380/279 |
| 7,802,111 B1 * | 9/2010 | Tahan | ..................... | G06F 21/57 380/259 |
| 8,910,242 B2 * | 12/2014 | Komiyama | ............. | G06F 21/44 726/2 |
| 2002/0073316 A1 * | 6/2002 | Collins | ................. | G06F 21/572 713/174 |
| 2005/0138393 A1 * | 6/2005 | Challener | ........... | G06F 21/6218 713/186 |

(Continued)

OTHER PUBLICATIONS

U.S. Appl. No. 61/791,632, filed Mar. 15, 2013.
(Continued)

*Primary Examiner* — Esther B. Henderson
(74) *Attorney, Agent, or Firm* — Arnold & Porter Kaye Scholer

(57) ABSTRACT

A computer processor and a security enhancing chip may be provided. In one aspect, the computer processor may comprise a storage for storing an encryption key, a central processing unit (CPU) configured to execute one or more software programs, and a circuit configured to calculate a hash function to generate a hash value for data loaded into the computer processor and generate an authentication token for a request initiated by a software program running on the CPU. In another aspect, the security enhancing chip may comprise a first storage for storing an encryption key, a second storage for storing a certificate, a hash storage and circuit components configured to validate, using the first certificate, command(s) adding the encryption key to the first storage and storing a first hash to the hash storage, and to process a request if a second hash in the request is equal to the first hash.

24 Claims, 4 Drawing Sheets

(56) References Cited

U.S. PATENT DOCUMENTS

| | | | |
|---|---|---|---|
| 2005/0144481 A1* | 6/2005 | Hopen | G06F 21/6218 726/4 |
| 2005/0166040 A1* | 7/2005 | Walmsley | B41J 2/04505 713/150 |
| 2005/0228986 A1* | 10/2005 | Fukasawa | H04L 9/3263 713/156 |
| 2008/0072066 A1* | 3/2008 | Vogler | G06F 21/31 713/187 |
| 2009/0249492 A1* | 10/2009 | Boesgaard Sorensen | G06F 21/556 726/27 |
| 2014/0281587 A1 | 9/2014 | Ignatchenko | |

OTHER PUBLICATIONS

U.S. Appl. No. 61/792,996, filed Mar. 15, 2013.
Anonymous, "TCG Mobile Trusted Module Specification," Specification version 1.0, Revision 6, pp. 1-105, Jun. 26, 2008. Web. Mar. 31, 2010 <http://www.trustedcomputinggroup.org/files/resource_files/87852F33-1D09-3519-AD0C0F141CC6B10D/Revision_6-tcg-mobile-trusted-module-1_0.pdf.
Ekberg et al., "Mobile Trusted Module (MTM)—an introduction," *Nokia Research Center*, Nov. 14, 2007. Web. Sep. 4, 2009 <http://research.nokia.com/sites/default/files/tr/NRC-TR-2007-015.pdf>.
International Search Report and Written Opinion dated Jul. 7, 2014, as received in International Application No. PCT/IB2014/060282.
Itoi et al., "Personal Secure Booting," *Lecture Notes in Computer Science/Computational Science*, 2119:130-144 (2001).

\* cited by examiner

SYSTEMS, METHODS AND APPARATUSES FOR SECURE STORAGE OF DATA USING A SECURITY-ENHANCING CHIP

RELATED APPLICATIONS

This application claims priority to U.S. Provisional Application No. 61/806,639, filed Mar. 29, 2013, entitled "Systems, Methods and Apparatuses for Secure Storage of Data Using a Security-enhancing Chip," the content of which is incorporated herein by reference in its entirety.

FIELD OF THE DISCLOSURE

The systems, methods and apparatuses described herein relate to the security of data storage, and in particular, a computer system using the data securely stored in an external storage.

BACKGROUND

A computer processor normally uses a variety of storage for data (e.g., code, or data operated on by code). For example, in addition to on-chip cache memory (e.g., L1, L2 caches), a modern day computer processor also needs to access the main memory of its host computer system for computing needs. Loading data from outside of the computer processor (such as the main memory), however, bears a lot of security risks because the data may be tampered with, or even worse, may be malicious. Thus, for security purposes, sometimes it is desirable for certain data (e.g., security related logic, BIOS) to be tamper protected, read protected, or both.

One existing solution stores the data to be protected on the computer processor chip. This solution, however, is limited by the non-volatile storage space available on the computer chip. Moreover, increasing non-volatile storage space to accommodate more data is generally not practical. Therefore, there is a need in the art for certain data to be securely stored in a storage external to a computer processor chip.

DETAILED DESCRIPTION

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

Figure 1:
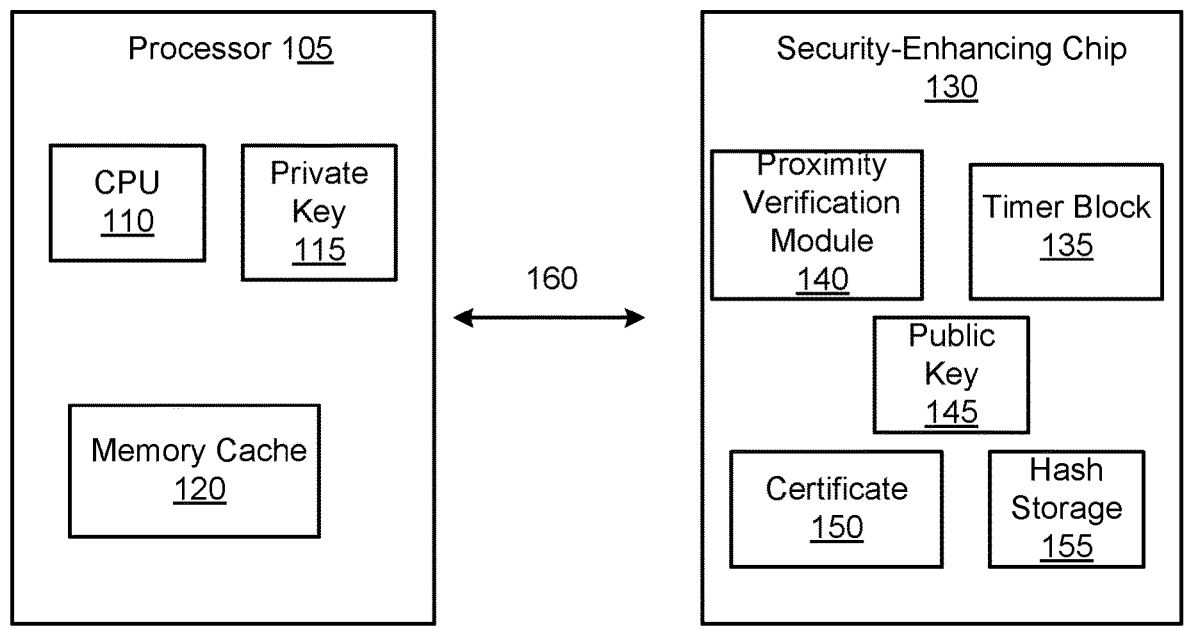
FIG. 1 is a block diagram of an exemplary system according to the present disclosure.

FIG. 1 shows a system 100 according to the present disclosure. The system 100 may have a processor 105 and a security-enhancing chip 130, which are connected through a communication channel 160. The communication channel 160 may be of any nature, for example, it may be a wired connection provided by the computer system main board (not shown) where the processor 105 and security-enhancing chip 130 are installed.

The processor 105 may have a central processing unit 110 that may execute one or more software programs, a memory cache 120, and a private key 115. The private key 115 may be unique for each processor 105 and may be stored in a way that it cannot be exposed outside the processor 105. The private key 115 may be added to the processor 105 when the processor 105 is manufactured, and may be stored in a non-volatile memory internal to the processor 105. By way of example and not limitation, the one or more software programs may comprise one or more of operating systems, BIOS executable modules, software applications or any other executable modules.

The processor 105 may be configured (i) to load data (e.g., on system boot) from a predefined range of addresses of physical memory (not shown) to the memory cache 120 and (optionally) to lock it (thus preventing it from future updates); (ii) using a predefined hash function to calculate the hash of that data; (iii) to sign the hash value with the private key 115 and to report the signed value, for example, on request of the security-enhancing chip 130; and (iv) to start execution from a specific address that is within the predefined range of addresses mentioned above using data read to the memory cache 120 and locked within it. In some embodiments, at least some of the operations may be performed in hardware components within the processor 105 specially tailored for such operations. For example, calculating the predefined hash function and/or signing a message having the hash value with the private key 115 may be performed by a circuit component, such as a microcontroller running firmware, a field programmable gate array (FPGA), or an application specific integrated circuit (ASIC).

The security-enhancing chip 130 may have a non-volatile storage storing a public key 145 that corresponds to the private key 115 of the processor 105, another non-volatile storage storing a certificate 150 comprising one or more public keys that may be used for signature verification of messages sent to the chip 130, and a hash storage 155 that may be used for storing one or more hash values (usage of which will be discussed in greater details below). In some embodiments, the hash storage 155 may also store some data associated with each of hashes. It should be noted that in some embodiments, the storage for the public key 145, the certificate 150 and hash storage 155 may be combined and implemented by a single non-volatile memory block. In some other embodiments, the storage for the public key 145, the certificate 150 and hash storage 155 may be implemented by two or more separate memory blocks, or even each being implemented by a separate memory block.

In some embodiments, the security-enhancing chip 130 may have a timer block 135, and a proximity validation module 140. The timer block 135 and the proximity validation module 140 may be implemented in hardware or a combination of hardware and software, respectively. For example, either or both of the timer block 135 and the proximity validation module 140 may be implemented in application specific integrated circuits (ASICs) or the chip 130 may include programmable processing circuitry to implement the modules. In some embodiments, the proximity validation module 140 may generate a communication message to send to the processor 105 and receive one or more responses to the message from the processor 105. In these embodiments, the timer block 135 may count a time interval from the communication message being sent to the first response being received. Based on the received responses and time counted by the timer block 135, the proximity validation module 140 may determine whether the processor 105 is located within a certain distance.

One non-limiting example of proximity validation using a timer and a proximity validation module may be found in U.S. Provisional Patent Application 61/792,996, entitled "Systems, Methods and Apparatuses for Ensuring Proximity of Communication Device," filed on Mar. 15, 2013, the content of which is incorporated by reference in its entirety. For example, in some embodiments, using the timer block 135 and the proximity validation module 140, the security-enhancing chip 130 may verify that the processor 105 is located within a distance that corresponds to distances between parts assembled on the same main board, for example, 0.5 meter or less.

In some embodiments a security enhancing chip 130 may comprise functionality similar to functionality of the Trusted Platform Module (TPM).

Figure 2:
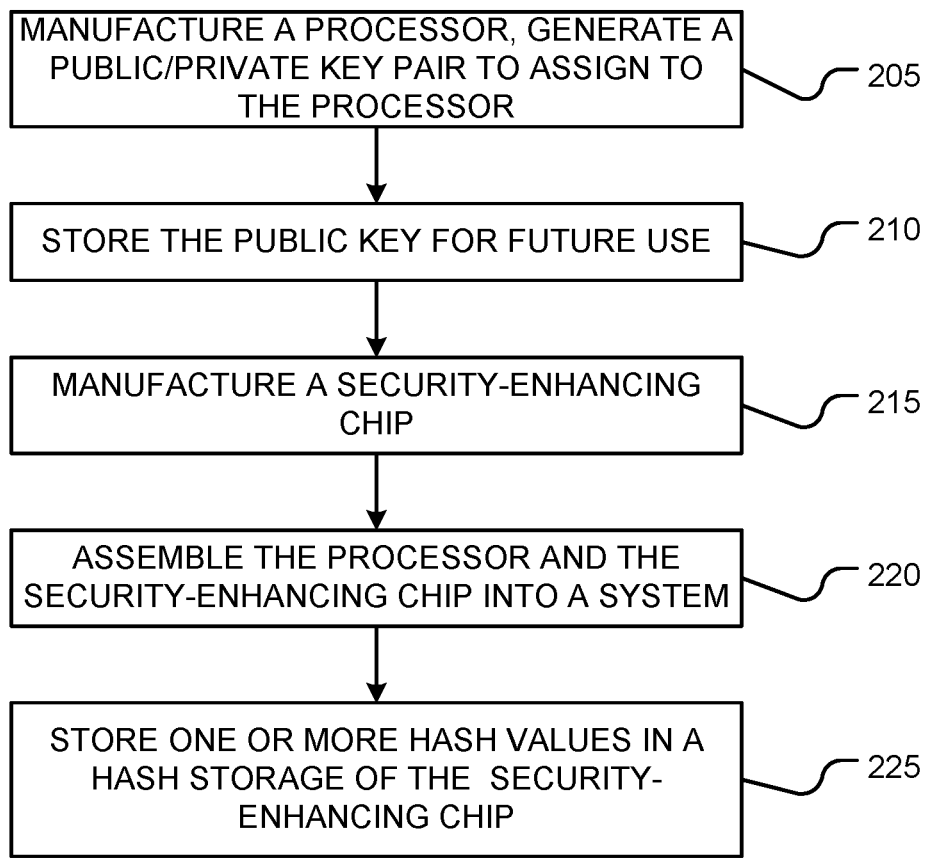
FIG. 2 is a flow diagram illustrating an exemplary process for preparing a computer processor and a security-enhancing chip according to the present disclosure.

FIG. 2 shows an exemplary process 200 of manufacturing of the system 100. At block 205, a processor 105 may be manufactured and a public/private key pair may be generated and assigned to the processor 105. The private key 115 may be stored in the processor 105 while the public key may be made available to the manufacturer of the processor 105. In one embodiment, the public/private key pair may be generated using a random number generator (not shown), such as, for example, a thermal-noise based or Zener noise-based generator located within the processor 105. In other embodiments, the public/private key pair may be generated externally, and the private key 115 may be transferred into the processor 105 at the time of manufacture of the processor 105.

At block 210, the public key may be stored for future use. For example, the manufacturer of the processors 105 may store the public keys for all processor 105 manufactured and provide the public keys to manufacturers of the security-enhancing chips 130. It may be desirable to restrict access to the manufacturing facility, so as to ensure that only "good" public keys (i.e., keys from actually-manufactured processors, not just fake key sets generated maliciously) are reported.

At block 215, the security-enhancing chip 130 may be manufactured. In the process of manufacturing, a certificate 150 may be stored permanently inside the chip 130 so that it may not be possible to modify it later. It should be noted that, at the time of manufacture, the chip 130 may have no public key 145 stored therein and the public key 145 may be stored later as part of an initialization process for the chip 130. In some embodiments, the chip 130 is deemed to be not initialized and may not be fully functional unless the public key 145 is added.

At block 220, the system 100 may be assembled, and an encryption key (e.g., the public key 145 that corresponds to the private key 115) may be added to the security-enhancing chip 130. To enhance security, a command to add an encryption key may be signed using a private key corresponding to a public key in the certificate 150. Signing the command may be performed by any entity who has access to the private key, for example, the manufacturer of the chip 130 or an authorized third party. The signature may be verified using the certificate 150. In some embodiments, before signing the command, the manufacturer of the chip 130 may verify, with the aid of the manufacturer of the processor 105 that the encryption key to be added to the security-enhancing chip 130 is indeed a public key corresponding to a private key of an actually manufactured processor 105.

At block 225, one or more hash values may be stored in the hash storage 155. A command to store a hash value may be signed by a party (e.g., an authorized third party or the manufacturer of the chip 130), and the chip 130 may verify the signature before actually executing this command. In some embodiments, the command to store a hash value may be signed using the same private key used to sign the command to add a key. In some other embodiments, the command to store a hash value may be signed using a private key different from the private key signing the command to add a key. Further, in some embodiments, a command may be accompanied with a chain of certificates that certify a private key that is used for signing the command so that the chain may be validated using a certificate stored in the chip.

Moreover, in some embodiments, a single command may be used to add the public key 145 and store one or more hash values to the security-enhancing chip. In these embodiments, the single command may be signed using the private key and the signature may be verified using the certificate 150.

Figure 3A:
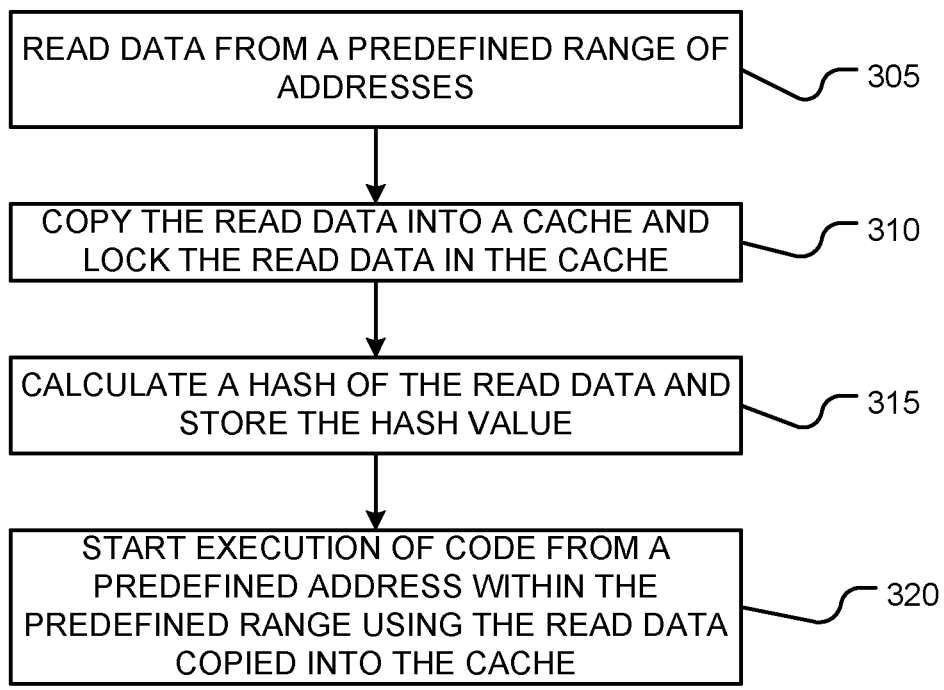
FIG. 3A is a flow diagram illustrating an exemplary process for loading and executing code during a system boot according to the present disclosure.

FIG. 3A shows an exemplary boot process 300 of the system 100. At block 305, the processor 105 may read data from a predefined range of addresses. The predefined range may be defined within an external physical memory (for example, from the address 0x0 to 0xFFFFF in the hexadecimal notation). In some embodiments, this range may correspond to a memory segment within a random access memory (RAM); in other embodiments, it may correspond to the whole range of the external read-only memory (ROM); in yet other embodiments, the data from ROM may initially be copied to the RAM.

At block 310, the processor 105 may copy the data read at block 305 to a processor cache (e.g., the memory cache 120) and to (optionally) lock it there, i.e., preventing the data from being updated while the processor is running.

In some embodiments, some or all data segments read from a respective range of addresses in the ROM may be authenticated inside the processor, and the read operation is deemed successful only if the data authentication is successful. Such a read process may ensure that the content read from a data segment within the ROM will be the same for any successful read operations over that segment. In one non-limiting example, an external ROM may store data in a secured format and a processor may implement validation mechanism to validate the data stored in the secured format. For example, the secured format may be authentication, encryption, or both, and the processor may implement corresponding validation mechanism in hardware (such as a memory controller implementing the validation algorithm in ASIC) or software (such as executable code to be executed by the processor or a memory controller of the processor). One exemplary embodiment of the processor 105 and the external ROM (not shown) may be implemented as discussed in U.S. patent application Ser. No. 14/206,992, entitled "Systems, Methods and Apparatuses for Using a Secure Non-Volatile Storage with a Computer Processor," filed on Mar. 12, 2014, the content of which is incorporated by reference in its entirety. In such embodiments there may be no need in caching the data and locking it in the data cache because each time when the processor 105 needs a certain data segment, it may re-read this segment. It should be noted that in these embodiments the processor 105 may still cache (and, optionally, lock) the data, if necessary.

At block 315, the processor 105, using a predefined hash function, may calculate a hash of the data read at block 305 and store the hash value within the processor 105 (e.g. in the memory cache 120). It should be noted that, in some embodiments, operations to be performed in blocks 305, 310, and 315 may be combined. In such embodiments, the processor 105 may calculate a hash while the data is being read from a predefined range of addresses.

At block 320, the processor 105 may start execution from a predefined address within the predefined range using the data copied to the processor cache. For example, the processor 105 may start execution from a command stored in the memory cache 120 that corresponds to the logical address 0x0 in the hexadecimal notation.

Figure 3B:
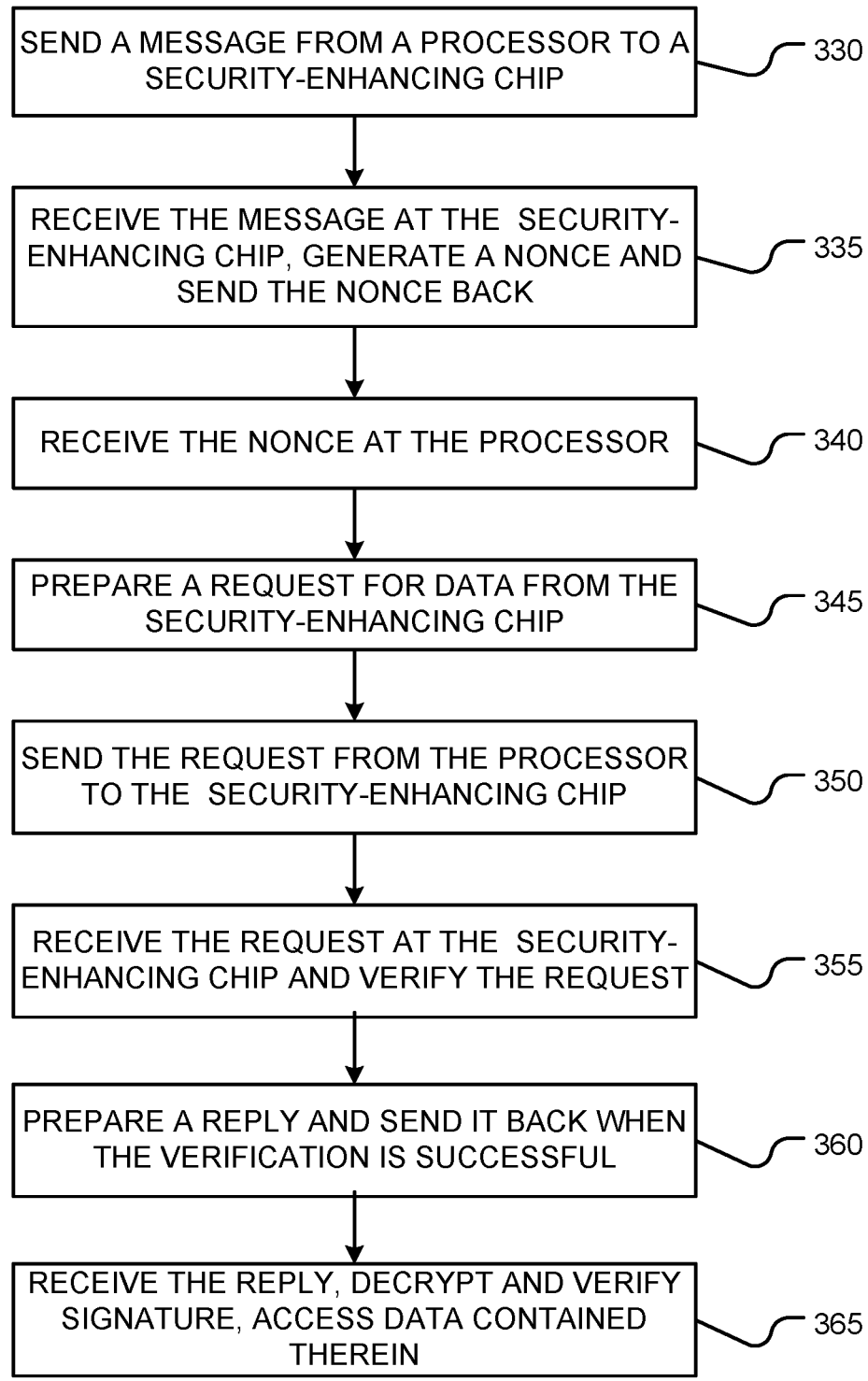
FIG. 3B is a flow diagram illustrating an exemplary process for a computer processor to read data from a security-enhancing chip according to the present disclosure.

FIG. 3B shows a process 325 of forming and processing a request for data sent by the processor 105 to the security-enhancing chip 130. For example, the request for data may be a request for an encryption key or pieces of code previously stored in the chip 130. In some embodiments, sending the request may be initiated by a software program executed by the CPU 110.

At block 330, the processor 105 may send a message to the chip 130 indicating that a request is about to be sent. Then, at block 335, the security-enhancing chip 130 may receive this message, generate a nonce, and send the nonce back to the processor 105.

At block 340, the processor 105 may receive the nonce, and at block 345, may prepare the request for data or service from the security-enhancing chip. Such a request may be, for example, a request for root key certificate from a key storage (not shown) within the security-enhancing chip, a request to store a certificate (e.g., in the key storage) within the security-enhancing chip, a request to encrypt or sign data, or to decrypt or to verify a signature using a private key (not shown) stored within the security-enhancing chip, etc. In addition to data specifying what is requested (for example, an encryption key previously stored in the chip 130), the request may contain a hash value calculated at step 315, and the value of the nonce received at block 335. In one embodiment, the request may be signed using the private key 115.

At block 350, the request may be sent to the security-enhancing chip. For example, the processor 105 may send the request to the security-enhancing chip 130 after the preparation of the request is completed (and signed in certain embodiments). At block 355, the security-enhancing chip 130 may receive the request and verify the received request. For example, if the request is signed, the chip 130 may validate the signature of the request using the public key 145 stored inside the chip 130. Moreover, the chip 130 may verify that the nonce sent at block 335 is equal to the nonce received with the request. If both checks are passed successfully, the chip 130 may compare the hash value received in the request with one or more values stored in the hash storage 155. If no match is found, the request may be declined. In addition, in some embodiments, the security-enhancing chip 130 may also verify that the processor 105 is within a distance that may correspond to the distance between parts assembled on the same main board. If this verification fails, this may indicate that the processor 105 and the security-enhancing chip 130 are not on the same main board, and, therefore, an attack on the system 100 is mounted. In this case the request may also be declined.

If the request satisfies all the checks, at block 360, a reply may be prepared and sent back to the processor 105. For example, if some data is requested (e.g., an encryption key), the data may be signed and/or encrypted by the public key 145. In some embodiments, the reply data may contain the data stored in the hash storage 155 in association with the received hash value, or may be calculated based, at least in part, on the data stored in the hash storage 155 in association with the received hash value. If the request is for storing some data, the chip 130 may store the data contained in the request and prepare a confirmation message. In some embodiments, the data contained in the request may be stored in association with the hash received from the processor 105.

At block 365, the processor 105 may receive the reply, decrypt it and/or verify its signature, and access its data.

In some embodiments, the system as described above may be used for storing sensitive data of a computing system. In such embodiments, the security enhancing chip 130 may implement the functionality of zero or more of the following: certificate storage, private key storage, read-only memory (ROM), and a secure timer. For example, the certificates, encryption keys and ROM data may be stored within the hash storage 155 (in association with some hash value or without such association), and the functionality of a secure timer may be implemented by either the timer block 135 or by an additional timer (not shown).

In one non-limiting embodiment, a computing system may execute one or more virtual machines on a computer processor. One exemplary embodiment of such a computing system is discussed in U.S. Provisional Patent Application 61/791,632, entitled "Secure Zone on a Virtual Machine for Digital Communications," filed on Mar. 15, 2013, the content of which is incorporated by reference in its entirety. In such a computing system, on system start, the code of the hypervisor may be loaded to the predefined range of memory and then loaded and locked in the processor cache. In some embodiments, the code of hypervisor may be stored in the ROM (not shown), and addresses in the predefined range may be mapped to that ROM during the system start. Thus, in such embodiments, the code is not actually loaded to the predefined range of memory but the predefined range of memory may be mapped to the ROM. Regardless of whether the code of the hypervisor is loaded to the predefined range of memory or the predefined range of memory is mapped to the ROM storing the code of hypervisor, a hash value of the code of hypervisor may be calculated according to the embodiments described herein. Subsequently, as a result of execution of the code of hypervisor, the code for a supervisor that establishes and administers a protected computing environment may be loaded and executed as one of virtual machines.

In some embodiments, the hypervisor may be responsible to verify that trusted code is used as the code of the supervisor. For example, the hypervisor may first calculate the hash of the code of the supervisor and compare it with a predefined value contained within the code of hypervisor. In addition, the hypervisor may configure virtual machines so that only those virtual machines which are authorized to perform security-related operations, and those for which the hypervisor has a validated hash (such as the virtual machine that contains the supervisor), are allowed to access the security-enhancing chip. Then, whenever the supervisor needs to perform a security-related operation (such as, for example, to digitally sign data on behalf of some software code being executed, or to update the secure timer), a corresponding request may be sent from the processor 105 to the security-enhancing chip 130.

It should be noted that the corresponding request may comprise the hash value calculated for data in the predefined range of memory, that is, the hash value for the code of hypervisor. By comparing the hash of the data that corresponds to the predefined range with values of hashes stored in the hash storage 155, the security-enhancing chip 130 may effectively verify whether an authenticated hypervisor is running on the processor 105. Because the hypervisor ensures that only those virtual machines that run trusted software have access to the security-enhancing chip, the verification may ensure that the received request is indeed sent from a system with an intended configuration (e.g., authorized and authenticated).

In some embodiments, a symmetric cryptography may be used for request authentication. In such embodiments, in addition to or instead of signing the request to generate a signature and using the signature as an authentication token, any kind of message authentication code (MAC) involving a secret key stored in a storage of the processor 105 may be used. For example, a secret key may be saved permanently inside the processor 105 at the time of manufacturing the processor 105, and a copy of this secret key may be stored in the chip 130 as part of an initialization process for the chip 130. Then when the system 100 is assembled, the processor 105 may use this secret key to generate a MAC as an authentication token for a request to be sent to the chip, and the chip 130 may use its copy of the secret key to verify the MAC received along with the request.

In some embodiments, generation of authentication token(s) may be performed by one or more hardware components within the processor 105 tailored for such operations. For example, any of the operations for encrypting the request, signing the request to generate a signature, or generating MAC using a secret key may be performed by a circuit component, such as a microcontroller running firmware, a field programmable gate array (FPGA), or an application specific integrated circuit (ASIC).

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of microprocessors, microcontrollers, field programmable gate arrays (FPGAs), application specific integrated circuits (ASICs), and/or System on a Chip (Soc)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. A computer processor of one computing device, the processor comprising:
   a storage of the processor for storing one or more encryption keys;
   a central processing unit (CPU) of the processor, the CPU being configured to run one or more software programs; and
   a circuit of the processor configured to:
   calculate a hash function to generate a hash value for first data loaded into the computer processor, the first data comprising executable code for at least one of the one or more software programs; and
   generate an authentication token, using at least one encryption key stored in the storage, for a request for a chip to perform an operation initiated by a software program running on the CPU, wherein to generate the authentication token includes to generate a message authentication code (MAC) of the request using a secret key in the at least one encryption key corresponding to a second secret key of the chip, and wherein the request contains the hash value for the first data loaded into the computer processor.

2. The computer processor of claim 1, wherein the operation of the request comprises one of for the chip to retrieve second data, for the chip to store the first data, and for the chip to perform a service.

3. The computer processor of claim 1, wherein the at least one encryption key is a private key of a public and private key pair and the authentication token further includes a signature of the request.

4. The computer processor of claim 3, wherein the CPU is further configured to:
generate the public and private key pair;
store the private key of the public and private key pair in the storage as the at least one encryption key of the one or more encryption keys;
report the public key of the public and private key pair; and
use the private key to sign the request to include with the authentication token for the request.

5. The computer processor of claim 1, wherein the CPU is further configured to receive a nonce; and add the nonce to the request.

6. The computer processor of claim 1, wherein to generate the authentication token comprises at least one of to encrypt the request and to sign the request.

7. The computer processor of claim 1, further comprising a memory cache, wherein the first data loaded into the computer processor is loaded into the memory cache, and wherein the hash value for the first data is calculated after the first data is loaded into the memory cache.

8. The computer processor of claim 1, further comprising a memory cache, wherein the first data loaded into the computer processor is loaded into the memory cache, and wherein the hash value for the first data is calculated when the first data is loaded into the memory cache.

9. The computer processor of claim 1, wherein the CPU is further configured to authenticate at least some portion of the first data when reading the first data into the computer processor.

10. The computer processor of claim 1, wherein the circuit comprises one of: a microprocessor, a microcontroller, a field programmable gate array (FPGA) and an application specific integrated circuit (ASIC).

11. A method for operating a computer processor of one computing device, the method comprising:
calculating a hash function using a circuit in the computer processor to generate a hash value for first data loaded into the computer processor, the first data comprising executable code to be executed on a central processing unit (CPU) of the computer processor;
initiating a request for a chip to perform an operation by a software program executing on the CPU, the request comprising the hash value; and
generating an authentication token for the request using the circuit and at least one encryption key stored in a storage of the computer processor, wherein generating the authentication token includes generating a message authentication code (MAC) of the request using a secret key in the at least one encryption key corresponding to a second secret key of the chip, and wherein the request contains the hash value for the first data loaded into the computer processor.

12. The method claim 11, wherein the operation of the request comprises one of for the chip to retrieve second data, for the chip to store the first data, and for the chip to perform a service.

13. The method claim 11, wherein the at least one encryption key is a private key of a public and private key pair and the authentication token further includes a signature of the request.

14. The method of claim 13, further comprising:
generating the public and private key pair;
storing the private key of the public and private key pair in the storage as the at least one encryption key;
reporting the public key of the public and private key pair; and
using the private key to sign the request to include with the authentication token for the request.

15. The method of claim 11, further comprising receiving a nonce; and adding the nonce to the request.

16. The method of claim 11, wherein generating the authentication token comprises at least one of encrypting the request and signing the request.

17. The method of claim 11, wherein the computer processor comprises a memory cache and the first data loaded into the computer processor is loaded into the memory cache, and wherein the hash value for the first data is calculated after the first data is loaded into the memory cache.

18. The method of claim 11, wherein the computer processor comprises a memory cache and the first data loaded into the computer processor is loaded into the memory cache, and wherein the hash value for the first data is calculated when the first data is loaded into the memory cache.

19. The method of claim 11, further comprising authenticating at least some portion of the first data when reading the first data into the computer processor.

20. The method of claim 11, wherein the circuit comprises one of: a microprocessor, a microcontroller, a field programmable gate array (FPGA) and an application specific integrated circuit (ASIC).

21. The computer processor of claim 1, wherein processor is further configured to transmit the authentication token and the request to the chip of the computing device to check the hash value and verify the MAC.

22. The computer processor of claim 21, wherein the circuit of the processor is further configured to:
receive a reply from the chip in response to the request, the reply containing a second hash value; and
authenticate the reply based on determining whether the second hash value of the reply is equivalent to the hash value transmitted with the request.

23. The method of claim 11, further comprising transmitting the authentication token and the request to the chip of the computing device to check the hash value and verify the MAC.

24. The method of claim 23, further comprising:
receiving a reply from the chip in response to the request, the reply containing a second hash value; and
authenticating the reply based on determining whether the second hash value of the reply is equivalent to the hash value.

* * * * *